United States Patent [19]
Choi

[11] Patent Number: 5,596,657
[45] Date of Patent: Jan. 21, 1997

[54] METHOD OF SORTING OUT CANDIDATE CHARACTERS IN CHARACTER RECOGNITION SYSTEM

[75] Inventor: Jae G. Choi, Seoul, Rep. of Korea

[73] Assignee: Goldstar Co., Ltd., Seoul, Rep. of Korea

[21] Appl. No.: 447,365

[22] Filed: May 23, 1995

Related U.S. Application Data

[63] Continuation of Ser. No. 955,915, Oct. 2, 1992, abandoned.

[30] Foreign Application Priority Data

Oct. 9, 1991 [KR] Rep. of Korea .................. 17699/1991

[51] Int. Cl.$^6$ ..................................................... G06K 9/68
[52] U.S. Cl. ............................................ 382/227; 382/207
[58] Field of Search ..................................... 382/173, 177, 382/187, 192, 139, 207, 227, 224

[56] References Cited

U.S. PATENT DOCUMENTS

| | | | |
|---|---|---|---|
| 4,491,960 | 1/1985 | Brown | 382/26 |
| 4,975,975 | 12/1990 | Filipski | 382/38 |
| 4,989,258 | 1/1991 | Takahashi et al. | 382/37 |
| 5,020,121 | 5/1991 | Rosenberg | 382/56 |
| 5,181,255 | 1/1993 | Bloomberg | 382/9 |
| 5,185,813 | 2/1993 | Tsujimoto | 382/9 |
| 5,193,121 | 3/1993 | Elisher et al. | 382/7 |
| 5,202,933 | 4/1993 | Bloomberg | 382/9 |

*Primary Examiner*—Joseph Mancuso
*Attorney, Agent, or Firm*—Fliesler, Dubb, Meyer & Lovejoy

[57] ABSTRACT

A method of sorting out candidate characters in a character recognition system comprising a character characteristic extracting step of extracting characteristics of characters on the basis of run-length information of the characters, a character distribution extracting step of determining position information of the characters on the basis of the extracted characteristics of the characters, a character classification reference data storing step of storing the determined position information of the characters as character classification reference data in storage means, and a candidate character sorting-out step of adopting the characters belonging to a particular one of the position information stored in the storage means corresponding to a characteristic of an input character to be recognized, as the candidate characters for the input character. According to the present invention, character recognition time can be reduced and an accuracy of the character recognition can be increased, as compared with the prior art.

3 Claims, 8 Drawing Sheets

METHOD OF SORTING OUT CANDIDATE CHARACTERS IN CHARACTER RECOGNITION SYSTEM

This application is a continuation of Ser. No. 07/955,915, filed Oct. 2, 1992, now abandoned.

BACKGROUND OF THE INVENTION

1. Field of the Invention

The present invention relates in general to a method of sorting out candidate characters in a character recognition system which recognizes characters utilizing a statistical manner, and more particularly to a method of sorting out candidate characters in a character recognition system which is capable of sorting out the candidate characters quickly and accurately by extracting characteristics of the characters on the basis of run-lengths to recognize combination type characters such as Hangul, Chinese characters and etc..

2. Description of the Prior Art

In a method of sorting out candidate characters in a statistical character recognition system in accordance with the prior art, the primary characteristics are obtained with respect to all of characters and the characters are then classified into a tree structure on the basis of similarities of the primary characteristics. Thereafter upon input of a character to be recognized, the primary characteristic of the input character is obtained and candidate characters for the input character are sought for along pre-stored trees on the basis of the primary characteristic. That is, characters (or character group) on the tree position to which the input character to be recognized corresponds are determined as the candidate characters for the input character.

As the method of obtaining the primary characteristics with respect to all of the characters and classifying the characters into the tree structure on the basis of the similarities of the primary characteristics, there are well-known a character classifying method employing meshes, a character classifying method employing a parallel characteristic on the basis of distances to pixels of characters and a character classifying method employing a time/frequency transformation.

Referring to FIG. 1, there is illustrated the character classifying method employing the meshes in accordance with the prior art. As shown in this figure, each characters is covered with n×n dimensional, lattice-shaped rooms, which are called the meshes. The number of pixels (for example, black pixels) of each of the characters which are included in the individual meshes is calculated. The calculated values are adopted as the primary characteristics of the characters. Similarities of the primary characteristics of the characters are obtained in the unit of the corresponding meshes. The characters are then classified into a tree structure as shown in FIG. 2, which is formed on the basis of the similarities of the primary characteristics.

For example, the n×n dimensional meshes are numbered and each characters i s covered with the numbered n×n dimensional meshes. The similarities of different characters are calculated on the basis of the primary characteristics every the meshes of the same number from 1 to NN (in the case of n×n dimensions). The characters are grouped into those of the same class on the basis of the similarities. The characters grouped into the same class are re-classified into those from 2nd to N×Nth, thereby resulting in forming an enormous tree structure as shown in FIG. 2. The method of calculating the similarities of the characters every the meshes of the same number is various and is performed mainly utilizing the Fisher's law, the Euclidian distance, the Mahalanobis distance and etc..

Thereafter upon input of an unknown character, the input character is covered with the meshes, which are numbered, and then the primary characteristic of the input character is extracted according to the number of pixels of the input character in the meshes. The tree structure previously defined as shown in FIG. 2 is searched on the basis of the primary characteristic of the unknown character, for a tree position to which the unknown character belongs. When the tree position which is the most similar to the unknown character is extracted, characters (character group) on the extracted tree position are determined as the candidate characters for the unknown character.

Alternatively, a small number of the most definite characteristics may be selected instead of using the n×n characteristics in all, so that the trees can be reduced in number. This has the effect of making the classification of the characters possible at a high speed.

Referring to FIG. 3, there is illustrated the character classifying method employing the parallel characteristic on the basis of the distances to the pixels of the characters. As shown in this figure, the distances from the left side of a box circumscribing each of the characters to the first pixels (for example, black pixels) of each of the characters are extracted in the unit of line as a classifying characteristic (parallel characteristic). Therefore, the above method is that classifies the characters on the basis of the classifying characteristic extracted in the above manner. In this method, measuring points are selected on the character circumscribing box at a constant interval with respect to one another and straight lines are drawn from the measuring points on the character circumscribing box to the first pixels of the character. The lengths of the straight lines are adopted as the primary characteristics of the characters.

Referring to FIG. 4, there is illustrated the character classifying method employing the time/frequency transformation. As shown in this drawing, the above method emphasizes a characteristic which the characters each possesses, by transforming a time domain into a frequency domain at a two-dimensional plane utilizing the Fourier transformation or the Laplace transformation. Therefore, the above method is that classifies the characters on the basis of the characteristics of the characters emphasized by the above-mentioned transformation.

However, the character classifying method employing the meshes encounters a problem of finding the number of the most effectively dimensional meshes divided to cover one character. Although the more number of the divided meshes results in a more accurate classification of the characters, a more time loss is caused due to an increase in the number of the meshes for extraction of the similarities. This makes the character recognition speed of the system fall. For this reason, 8×8 (64) dimensional meshes are mainly used in most of Hangul cases and 16×16 (256) dimensional meshes are mainly used in most of Chinese characters cases. If the dimension is high as mentioned above, the meshes are such increased in number that make the character recognition speed of the system fall.

The character classifying method employing the meshes has another disadvantage, in that the characters may be misrecognized in the case where they are subject to distortions, since the tree structure is previously defined and the candidate characters for the characters are then determined on the basis of the tree structure. That is, in the case where a certain character is subject to a distortion and, therefore, the characteristics of one or more meshes of the character exceed a critical value, the tree structure is searched for an extraordinary tree position. For this reason, the search falls into local minima, resulting in the misrecognition of the character.

Also, the character classifying method employing the meshes has a further disadvantage, in that much time is required in process since the more highly dimensional meshes result in an increase in the number of the characteristics. Moreover, in the case where the character circumscribing box is formed of a different size from the original size of an input character because of a noise mixed at the periphery of the input character, possibility of misclassification of the input character is high due to variation at the positions of the meshes.

The character classifying method employing the parallel characteristic as shown in FIG. 3 is advantageous, in that the characteristics are reduced in number as compared with those in the character classifying method employing the meshes. This has the effect of making the tree structure simple and reducing the character recognition processing time. However, the character classifying method employing the parallel characteristic is disadvantageous, in that branches of the character classifying characteristic are small in number. This results in an inaccurate classification of the characters. Also similarly to the character classifying method employing the meshes, since the character circumscribing box is varied in size when a noise is present in the character, a bottleneck is caused in positioning the character circumscribing box.

The character classifying method employing the time/frequency transformation is desirable in that the characteristics of the characters are definitely classified, but has the disadvantage of requiring much time in the transformation. Also in the case of combination type characters such as Hangul, Chinese characters and etc., the characteristic positions cannot definitely discriminated due to the structural problem of the characters.

SUMMARY OF THE INVENTION

Therefore, the present invention has been made in view of the above problems, and it is an object of the present invention to provide a method of sorting out candidate characters in a character recognition system which is capable of reducing the character recognition time and increasing an accuracy of the character recognition, as compared with the prior art.

In accordance with the present invention, the above object can be accomplished by a provision of a method of sorting out candidate characters in a character recognition system, comprising: a character characteristic extracting step of extracting characteristics of characters on the basis of run-length information of the characters; a character distribution extracting step of determining position information of the characters on the basis of the extracted characteristics of the characters; a character classification reference data storing step of storing the determined position information of the characters as character classification reference data in storage means; and a candidate character sorting-out step of adopting the characters belonging to a particular one of the position information stored in the storage means corresponding to a characteristic of an input character to be recognized, as the candidate characters for the input character.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
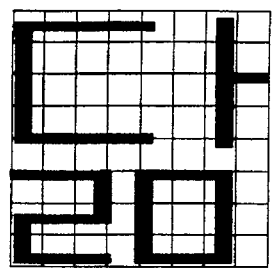
FIG. 1 is a view illustrating a character classifying method employing meshes in accordance with the prior art, in which a character is covered with the meshes of 8×8 dimensions.
Figure 2:
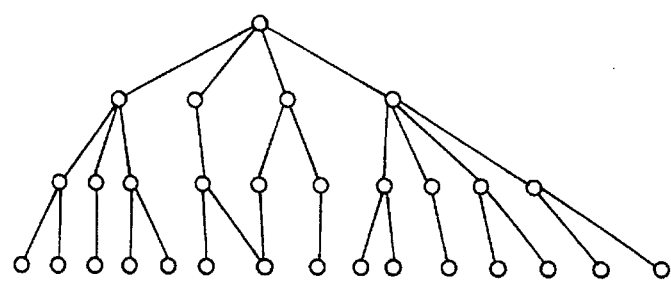
FIG. 2 is a view illustrating a tree structure in accordance with the prior art.
Figure 3:
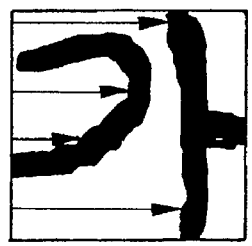
FIG. 3 is a view illustrating a character classifying method employing a parallel characteristic in accordance with the prior art.
Figure 4:
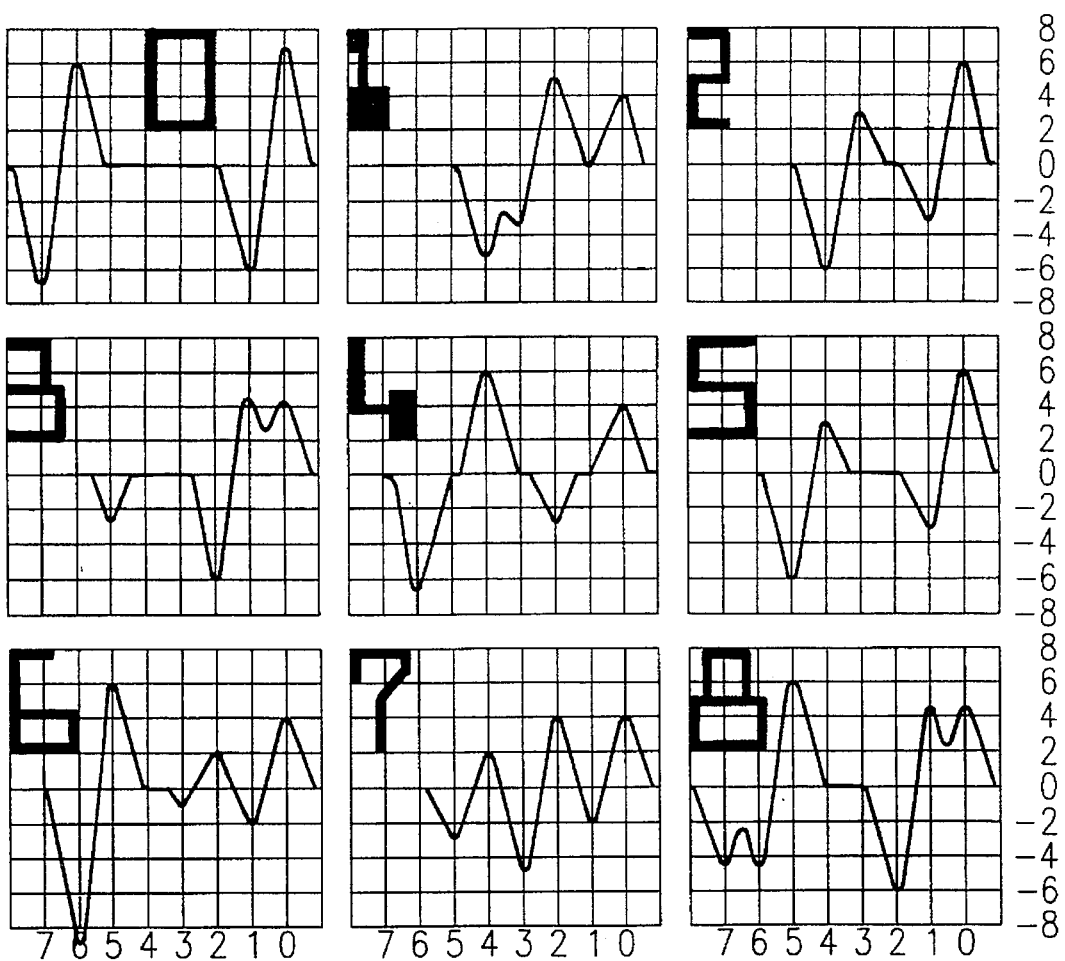
FIG. 4 is a view illustrating a character classifying method employing a time/frequency transformation in accordance with the present invention.

In a conventional statistical character recognition method, the recognition of an input character is performed by extracting the most similar characters to the input character from all of pre-stored characters. In this connection, in the case of combination type characters such as Hangul, the number of characters to be pre-stored runs into about 14,000 for 2,350 characters being presently used. For this reason, much time is required in comparing the input character with the pre-stored characters one by one. This results in making a recognition speed fall. There is also required a lager memory capacity.

Therefore, the present invention has been made in view of the above problems. In accordance with the present invention, characteristics of all of characters as objects to be recognized are first extracted and the characters are then grouped into those of the same characteristic. The characters grouped into the same characteristic are pre-stored in the unit of group. Thereafter upon input a character to be recognized, the input character is compared with the representative values of the character groups of the same characteristic in order to find the most similar character group to the input character. With the most similar character group found, the characters belonging to the found group are extracted and classified as candidate characters for the input character. Then, the character recognition process is performed by comparing the characteristic of the input character with each of the characteristics of the candidate characters.

A method of sorting out the candidate characters in the character recognition system in accordance with the present invention comprises a before character recognition processing step of extracting characteristics of characters, obtaining classification reference data on the basis of the extracted characteristics and storing the obtained classification reference data, and a character recognition processing step of extracting a characteristic of a character to be recognized and sorting out the candidate characters in the classification reference data on the basis of the extracted characteristic.

The before character recognition processing step includes a character characteristic extracting step S10 of forming a box circumscribing a character, obtaining length (referred to hereinafter as white run) information of successive white pixels and length (referred to hereinafter as black run) information of successive black pixels in horizontal (X-axis) and vertical (Y-axis) directions in the character circumscribing box, obtaining on the basis of the obtained information a X-axis characteristic and a Y-axis characteristic which represent characteristic points of the character positioned on X-Y coordinates and performing the above operation with respect to all characters to represent the characteristics of the characters as X-Y coordinates values, a character distribution extracting step S20 of obtaining histograms of the X-Y coordinates values and dividing the obtained histograms of the X-Y coordinates values by an experimentally obtained critical value to partition them into character distribution rooms in which the characters are distributed, and a classification reference data storing step S30 of storing position coordinates of the character distribution rooms partitioned at the character distribution extracting step S20 and the characters belonging to the character distribution rooms.

Upon input of a character to be recognized after provision of the classification reference data at the before character recognition processing step in the above-mentioned manner, there is performed the character recognition processing step. Namely, the character recognition processing step includes a candidate character sorting-out step S40 of performing the character characteristic extracting step S10 with respect to the input character to obtain a position characteristic of the input character on the X-Y coordinates, extracting one of the character distribution rooms positioned corresponding to the obtained position characteristic of the input character and adopting the characters belonging to the extracted character distribution room as candidate characters for the input character.

The character characteristic extracting step S10 includes a character circumscribing box forming step S11 of forming the box accurately circumscribing the character, a white/black run detecting step S12 of scanning the character pixels in the character circumscribing box from left to right in the unit of line to detect the white runs and the subsequent black runs of the character and storing the detected values (the number of pixels) [Wx($i$), Bx($i$)] (where, $i$ is a variable which is incremented by one whenever the black run is detected subsequently to the white run), a white-black run pair value detecting step S13 of detecting white run+black run pair values [$WBx(i)=Wx(i)+Bx(i)$] of the character if the scanning for the character is completed in the X-axis direction at the white/black run detecting step S12, a X-axis characteristic extracting step S14 of obtaining on the basis of the detected white run values, black run values and white-black run pair values the X-axis characteristic of the character which can be expressed by the following equation:

$$F(x) = \sum_i (Wx(i) \times Wx(i))/\sum_i (WBx(i)),$$

a Y-axis characteristic extracting step S15 of scanning the character pixels in the character circumscribing box from top to bottom in the unit of line to obtain the Y-axis characteristic of the character in the same manner as that obtains the X-axis characteristic of the character, a step S16 of repeatedly performing the above steps with respect to the same character to obtain the average position vector ($F_{ak}(X)$, $F_{ak}(Y)$) and the standard deviation ($\Delta_k(X)$, $\Delta_k(Y)$) of the character (where, a: average, k: kth character and $\Delta$: standard deviation), and a step S17 of obtaining the X-axis and Y-axis characteristics (F(x), F(y)) with respect to all the characters in the same manner as mentioned above and detecting the position coordinates of the characters which are expressed on a X-Y plane, on the basis of the average position vectors and the standard deviations of the characters.

The character distribution extracting step S20 includes a step S21 of obtaining the average standard deviation ($\Delta_T(X)$, $\Delta_T(Y)$) of the characters which can be expressed by the following equations:

$$\Delta_T(X) = \left( \sum_{i=0}^{m} \Delta i(X) \right)/m$$

$$\Delta_T(Y) = \left( \sum_{i=0}^{m} \Delta i(Y) \right)/m$$

where, m: the total number of the characters, and $\Delta_T$: average standard deviation, and a step S22 of obtaining the X-axis and Y-axis histograms on the basis of the average standard deviation of the characters and dividing the obtained histograms by the experimentally obtained critical value to partition them into the character distribution rooms in which the characters are distributed.

Figure 5:
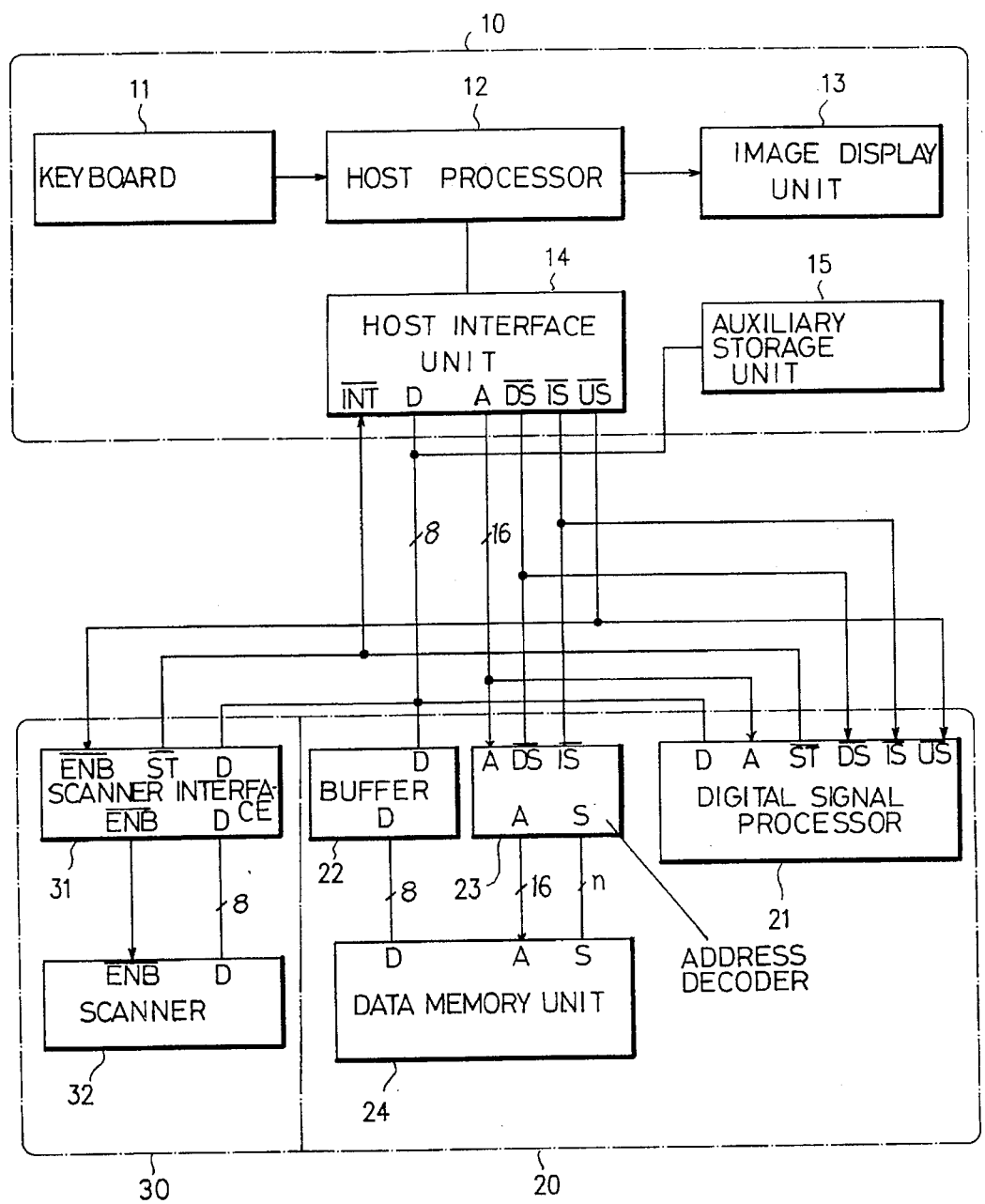
FIG. 5 is a block diagram of a statistical character recognition system in accordance with the present invention.

Referring to FIG. 5, there is shown a block diagram of the character recognition system for embodying the method of sorting out the candidate characters according-to the present invention. As shown in this drawing, the character recognition system comprises a general purpose computer 10 for controlling the character recognition process, a character recognition processor 20 for performing the character recognition process under the control of the general purpose computer 10, and a character input unit 30 for scanning a document to read a character image under the control of the general purpose computer 10.

The general purpose computer 10 includes a keyboard 11 for key input, a host processor 12 for controlling the character recognition process, a host interface unit 14 for interfacing a data signal D and control signals from the host processor 12, an image display unit 13 for image display and an auxiliary storage unit 15.

The character recognition processor 20 includes a digital signal processor 21 for performing the candidate character sorting-out operation for the character recognition, a buffer 22 for buffering input/output character data, a data memory unit 24 for storing the character data and an address decoder 23 for decoding an address signal A from the host processor 12 in the general purpose computer 10, to address the data memory unit 24.

The character input unit 30 is provided with a scanner interface 31 and a scanner 32, for scanning the document to read the character image under the control of the general purpose computer 10.

Herein, the reference numeral DS, not described, designates a data select signal, IS an input/output select signal, ST a strobe signal, INT an interrupt signal, ENB an enable signal and S a select signal.

The method of sorting out the candidate characters in accordance with the present invention utilizing the character recognition system with the above-mentioned construction will hereinafter be described.

First, in order to make out the character classification reference data, the user loads all the characters into the scanner 32 and gives the host processor 12 in the general purpose computer 10 a command for the before character recognition process through the keyboard 11. In response to the command from the user, the host processor 12 performs the before character recognition processing step with the control of the whole operation of the system.

Namely, upon receiving a start command through the keyboard 11, the host processor 12 controls such that the proceeding situation is displayed through the image display unit 13 and a character input command is transferred through the host interface unit 14 to the character input unit 30.

A scanner enable signal /ENB is sent to the scanner interface 31 and, therefore, it is applied to the scanner 32 through the scanner interface 31. With the scanner enable signal/ENB applied, the scanner 32 reads the character image data D.

The read character image data D is transmitted through the buffer 22 to the data memory unit 24 and to the auxiliary storage unit 15.

Thereafter, upon completion of the scanning by the scanner 32, a scanning completion signal from the scanner interface 31 is transmitted through the host interface unit 14 to the host processor 12. With the scanning completion signal transmitted, the host processor 12 outputs the address signal A to the address decoder 23 to address the data memory unit 24. As a result, the character image data stored at the addressed location of the data memory unit 24 is appalled through the buffer 22 to the digital signal processor 21. Then, the character characteristic extracting step S10 is performed to make out the character classification reference data.

Figure 6:
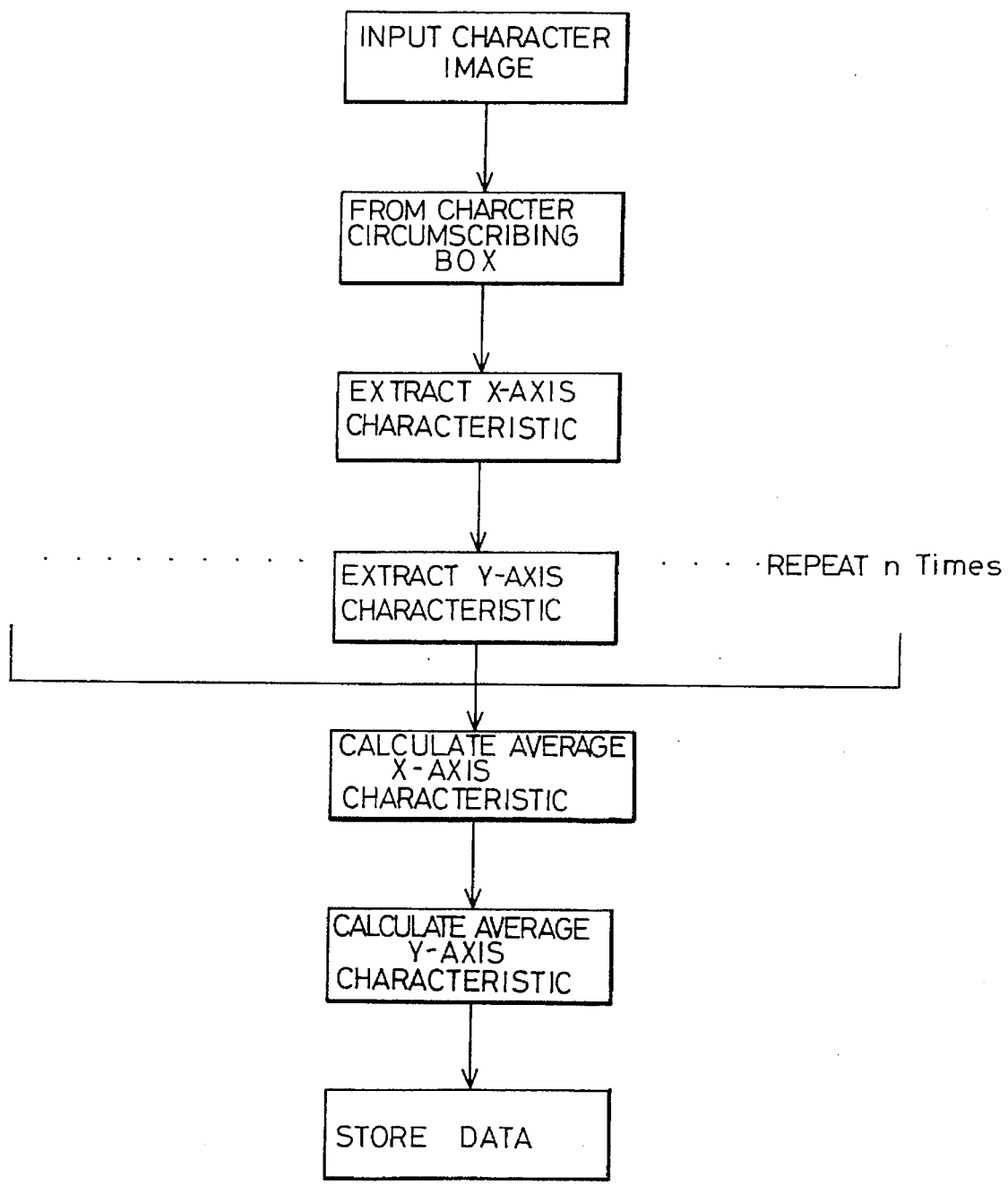
FIG. 6 is a flowchart illustrating a character characteristic extracting operation in accordance with the present invention.

In the character characteristic extracting step S10 which is performed by the digital signal processor 21, as shown in FIG. 6, there is first performed the step S11 of inputting the character image data and forming the box accurately circumscribing the character.

There is then performed the step S12 of scanning the character pixels in the character circumscribing box from left to right in the unit of line to detect the white runs and the subsequent black runs of the character and storing the detected values (the number of pixels) [Wx($i$), Bx($i$)] (where, i is a variable which is incremented by one whenever the black run is detected subsequently to the white run).

If the scanning for the character is completed in the X-axis direction at the white/black run detecting step S12, there is detected at the step S13 the white run + black run pair values [WBx($i$)=Wx($i$)+Bx($i$)] of the character.

There is then performed the step S14 of obtaining on the basis of the detected white run values, black run values and white-black run pair values the X-axis characteristic of the character which can be expressed by the-following equation:

$$F(x) = \sum_i (Wx(i) \times Wx(i))/\sum_i (WBx(i))$$

where, i is the number of the white-black run pairs.

Thereafter, there is performed the step S15 of scanning the character pixels in the character circumscribing box from top to bottom in the unit of line to obtain the Y-axis characteristic of the character in the same manner as that obtains the X-axis characteristic of the character. That is, the character pixels in the character circumscribing box are scanned -from top to bottom in the unit of line so that the white run values Wy(i), the subsequent black run values By(i) and the white run-black run pair values [WBy($i$)= Wy($i$)+By($i$)] of the character are detected. Extracted on the basis of the detected white run values, black run values and white-black run pair values is the Y-axis characteristic of the character which can be expressed by the following equation:

$$F(x) = \sum_i (Wy(i) \times Wy(i))/\sum_i (WBy(i)).$$

The above steps are, at the step S16, performed repeatedly with respect to the same character to obtain the average position vector ($F_{ak}(X)$, $F_{ak}(Y)$) and the standard deviation ($\Delta_k(X)$, $\Delta_k(Y)$) of the character (where, a: average, k: kth character and $\Delta$: standard deviation). In this connection, the characteristic of the character is extracted as a point on the X-Y coordinates.

The reason why the above steps are performed repeatedly with respect to the same character is because the classifying reference data must have objectivity to a degree. Namely, the classifying procedure is performed with respect to each of different styles and sizes of the same character and the standard of the characteristic of the same character is determined on the basis of the average value.

The extracted characteristic of the character is expressed as a two-dimensional characteristic, i.e., a point on the X-Y coordinates.

Figure 9:
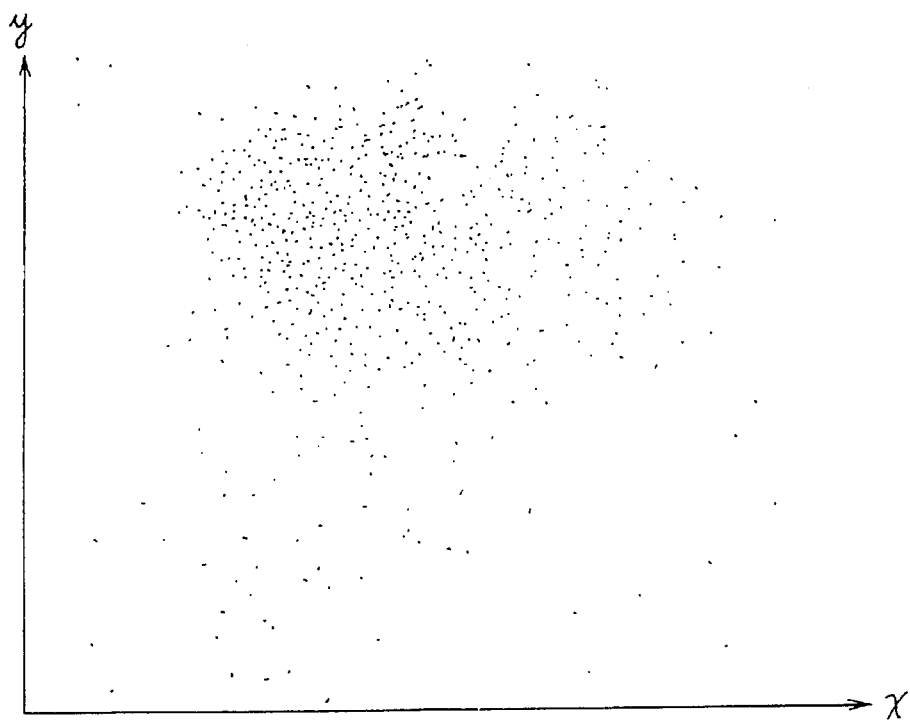
FIG. 9 is a view illustrating character characteristics on X-Y coordinates in accordance with the present invention.

There is then performed the step S17 of obtaining the X-axis and Y-axis characteristics (F(x), F(y)) with respect to all the characters in the same manner as mentioned above and detecting the position coordinates of the characters which are expressed on a X-Y plane, on the basis of the average position vectors and the standard deviations of the characters. As a result, the characteristics of the characters can be expressed respectively as points on the two-dimensional plane as shown in FIG. 9.

If the characteristics of all the characters are detected in the above manner, there is performed the step S20 of forming on the basis of the detected characteristics of the characters the character distribution rooms in which the characters are distributed.

In the step S20, there is first performed the step S21 of obtaining the average standard deviation ($\Delta_T(X)$, $\Delta_T(Y)$) of the characters which can be expressed by the following equations:

$$\Delta_T(X) = \left(\sum_{i=0}^{m} \Delta i(X)\right)/m$$

$$\Delta_T(Y) = \left(\sum_{i=0}^{m} \Delta i(Y)\right)/m$$

where, m: the total number of the characters, and $\Delta_T$: average standard deviation.

Figure 10:
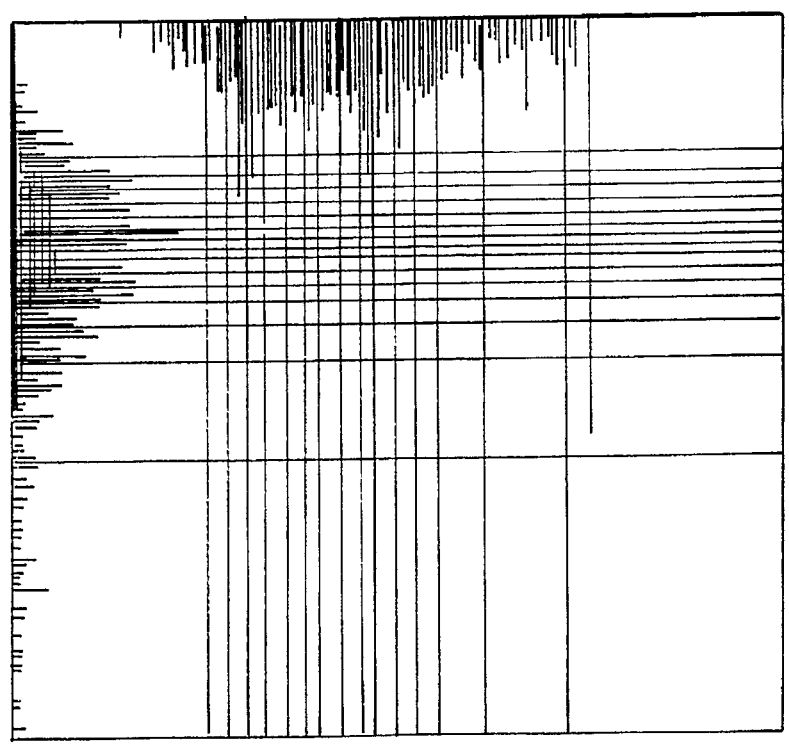
FIG. 10 is a view illustrating character distribution rooms which are obtained on the basis of X-Y histograms in accordance with the present invention.

At the step S22, the X-axis and Y-axis histograms are obtained on the basis of the average standard deviation of the characters and the obtained histograms are then divided by the experimentally obtained critical value to be partitioned into the character distribution rooms in which the characters are distributed. The critical value is a constant which is experimentally obtained such that the sums of the X-axis and Y-axis histograms are respectively above a predetermined value (for example, 50). Being divided by the experimentally obtained critical value, the histograms are partitioned into the character distribution rooms as shown in FIG. 10. Noticeably, at the positions where the characters are densely distributed, the partitioned character distribution rooms are small to that extent. Relatively, at the positions where the characters are not densely distributed, the partitioned character distribution rooms are large to that extent.

At the step S30, the position coordinates of the character distribution rooms obtained at the before character recognition processing step and the characters belonging to the character distribution rooms are stored as the character classification reference data in the auxiliary storage unit 15.

Thereafter at the character recognition processing step, the character classification reference data are read from the auxiliary storage unit 15 and stored in the data memory unit 24, for the purpose of scoring-out the candidate characters for a character to be recognized.

In the character recognition process, the user loads the character to be recognized into the scanner 32 and gives the general purpose computer 10 a character recognition command through the keyboard 11. In response to the character recognition command from the user, the general purpose computer 10 first controls such that the character image data is read through the scanner 32 and then stored in the data memory unit 24. Under this condition, the general purpose computer 10 controls the character recognition process.

In the character recognition processing step, the characteristic of the character to be recognized is extracted in the same manner as that in the case of making out the character classification reference data. There is then extracted one of the character distribution rooms positioned corresponding to the extracted characteristic of the character to be recognized. In result, the characters belonging to the extracted character distribution room are adopted as the candidate characters for the character to be recognized.

Figure 7:
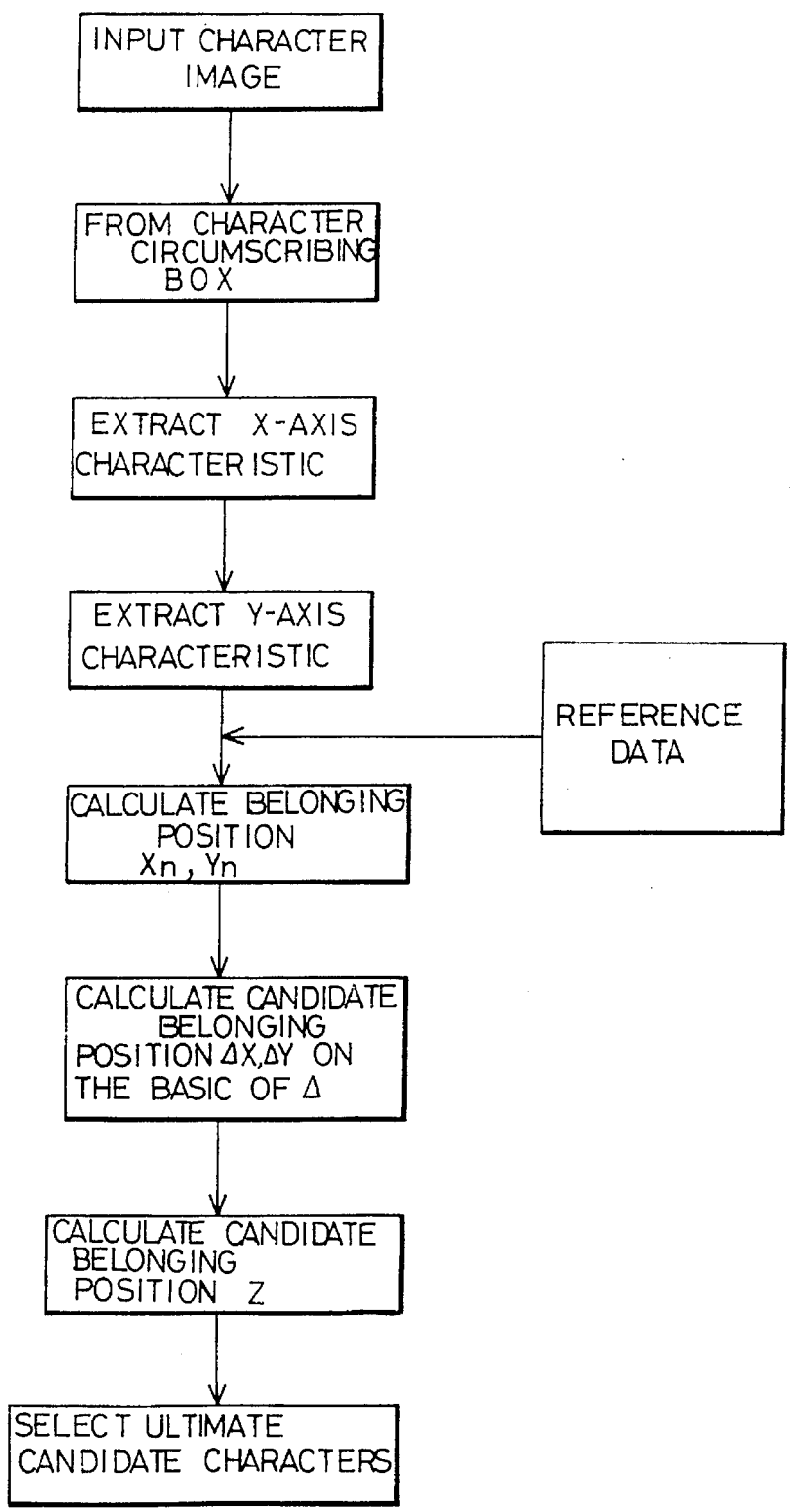
FIG. 7 is a flowchart illustrating a candidate character sorting-out operation in accordance with the present invention.
Figure 8:
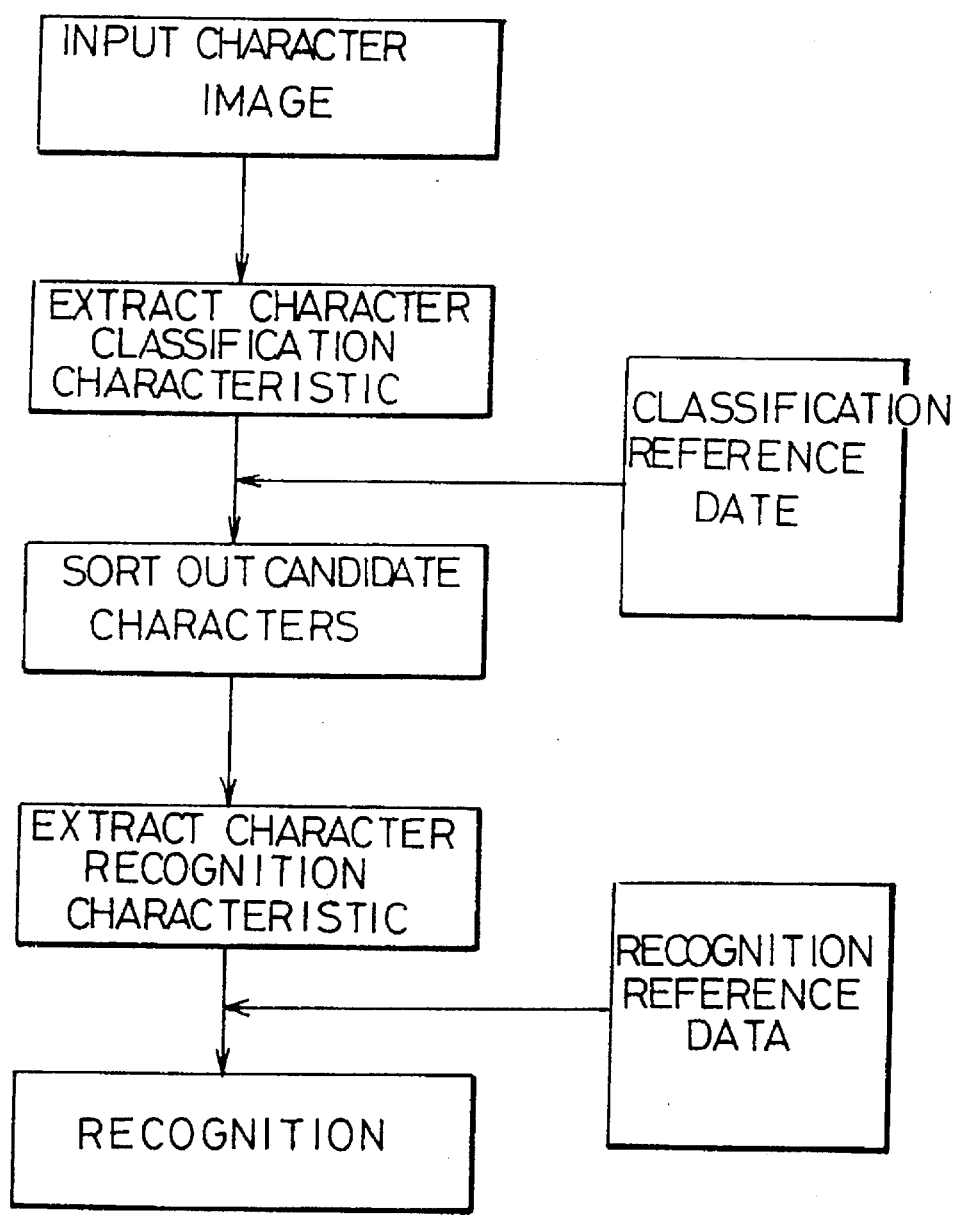
FIG. 8 is a flowchart illustrating a statistical character recognition controlling operation in accordance with the present invention.

The character recognition processing step including the candidate character sorting-out step S40 is performed by the digital signal processor 21 as shown in FIG. 7. Upon input of the character image signal to be recognized, the box accurately circumscribing the character is formed first. The white run values, black run values and white-black run pair values of the character are then detected by scanning the character circumscribing box in the X and Y-directions. The X-axis characteristic of the character is extracted on the basis of the white run values, black run values and white-black run pair values detected in the X-direction. Also, the Y-axis characteristic of the character is extracted on the basis of the white run values, black run values and white-black run pair values detected in the Y-direction.

Figure 11:
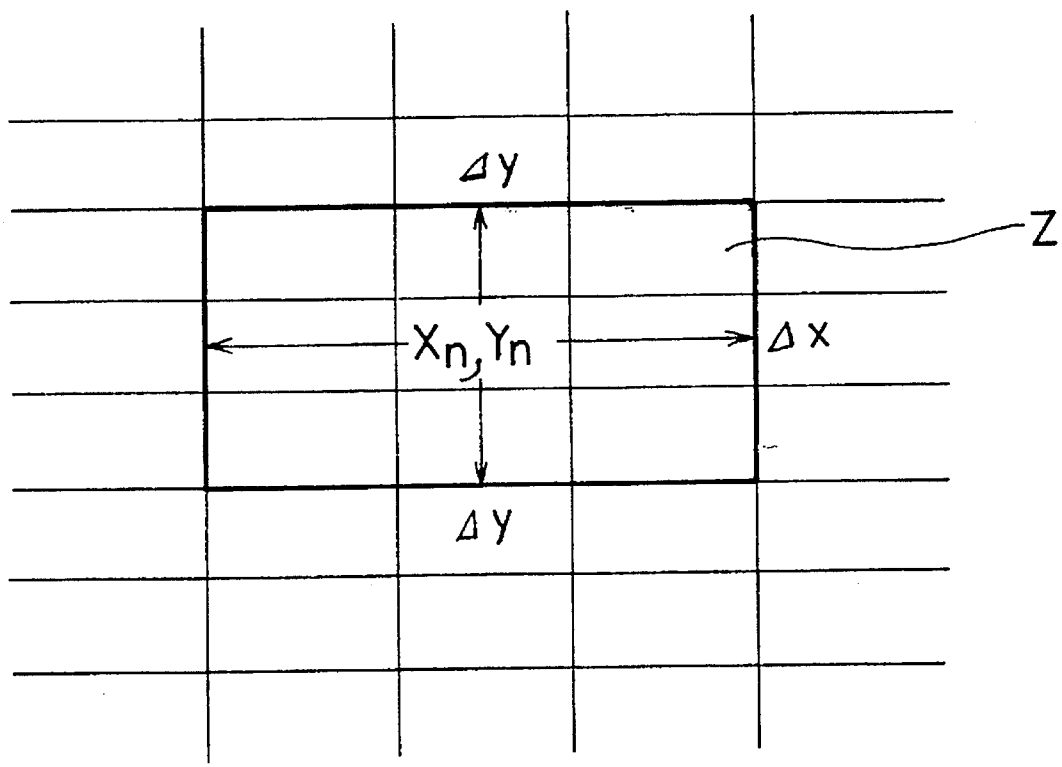
FIG. 11 is a view illustrating a candidate character area which is ultimately obtained in accordance with the present invention.

Thereafter, the search is made for one of the character distribution rooms positioned corresponding to the extracted X-Y characteristics of the character to be recognized. That is, the character distribution rooms stored as the character classification reference data are searched for a position to which the character to be recognized belongs. As shown in FIG. 11, if the corresponding room has the size smaller than $\Delta X$, $\Delta Y$, the characters belonging to all of the rooms included within the distance of $\Delta X$, $\Delta Y$ are adopted as the candidate characters (where, Xn, Yn: the coordinates value of the input character, $\Delta X$, $\Delta Y$: the previously obtained standard deviation and Z: the ultimate candidate character zone).

The ultimate candidate character position Z is then extracted on the basis of the variable range of the character belonging positions as shown in FIG. 11. As a result, the characters belonging to the ultimate candidate character position Z are sorted out as the candidate characters for the character to be recognized.

As hereinbefore described, according to the present invention, there is provided the method of sorting out the candidate characters in the character recognition system which represents the characteristics of the characters as the coordinates to make out the character classification reference data, pre-stores the made-out character classification reference data and sorts out quickly the candidate characters for the character to be recognized on the basis of the prestored character classification reference data. Therefore, in the case of combination type characters such as Hangul and Chinese characters, the characters can be recognized quickly. There is also required a relatively smaller memory capacity, resulting in an economical effect.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. An apparatus for sorting candidate characters in a character recognition system, comprising:

means for extracting X-axis and Y-axis features from an individual character of a classification set of characters, respectively, said extracting means including:

means for forming a box accurately circumscribing a character inputted through a scanner;

means for scanning character pixels in the character circumscribing box from left to right by units of a line to detect white runs and the subsequent black runs of the character and storing the detected values $W_x(i)$, $B_x(i)$ where i is a variable which is incremented by one whenever the black run is detected subsequent to the white run;

means for obtaining white run and black run pair values $WB_x(i)=W_x(i)+B_x(i)$ of the character when the scanning for the character is completed in the X-axis direction by said means for scanning;

means for obtaining, on the basis of the detected white run values, black run values and white/black run pair values an X-axis F(x) characteristic of the character expressed as:

$$F(x) = \frac{\sum_i [W_x(i)][W_x(i)]}{\sum_i WB_x(i)} \;;$$

means for scanning the character pixels in the character circumscribing box from top to bottom by units of a line to obtain a Y-axis characteristic F(y) of the character in the same manner as obtaining the X-axis characteristic F(x) of the character;

means for obtaining the average position vector $F_{ak}(x)$, $F_{ak}(Y)$ and a standard deviation $\Delta_k(X)$, $\Delta_k(Y)$ of the character where a is an average, k is a kth character and $\Delta$ is a standard deviation with respect to the above operations; and means for obtaining the X-axis and Y-axis characteristics F(x), F(y) with respect to all characters inputted through the scanner in the same manner as mentioned above and detecting position coordinates of the characters which are expressed on a X-Y plane, on the basis of the average position vectors and the standard deviations of the characters;

means for repeating the above operations a plurality of times to obtain an average position vector and an average standard deviation of said extracted X-axis and Y-axis features;

means for obtaining a feature point of said individual character on an X-Y plane by using said average position vector of the individual character;

means for obtaining a plurality of X-axis and Y-axis histograms which accumulate the number of characters having the same X-axis and Y-axis coordinates of the feature point, respectively;

means for assigning said X-Y plane to a plurality of ranges which have a critical value of the X-axis, Y-axis coordinates of the feature points, respectively; and means for sorting position coordinates of the assigned ranges and characters which belong to the individual ranges as reference data in a data storage means.

2. A method of sorting candidate characters in a character recognition system, comprising:

a) extracting X-axis and Y-axis features from an individual character of a classification set of characters, respectively, said extracting step including:

a character circumscribing box forming step for forming a box accurately circumscribing a character inputted through a scanner;

a white/black run detecting step for scanning character pixels in the character circumscribing box from left to right by units of a line to detect white runs and the subsequent black runs of the character and storing the detected values $W_x(i)$, $B_x(i)$;

a white/black run pair value detecting step for obtaining white run and black run pair values $WB_x(i)=W_x(i)+B_x(i)$ of the character on the basis of said detected values $W_x(i)$, $B_x(i)$;

an X-axis characteristic extracting step for obtaining, on the basis of the detected white run values, black run values and white/black run pair values, an X-axis characteristic $F(x)$ of the character expressed as:

$$F(x) = \frac{\sum_i [W_x(i)][W_x(i)]}{\sum_i WB_x(i)} ;$$

a Y-axis characteristic extracting step for scanning the character pixels in the character circumscribing box from top to bottom by units of a line to obtain a Y-axis characteristic $F(y)$ of the character in the same manner as performed previously for obtaining the X-axis characteristic $F(x)$ of the character;

a step for repeatedly performing the above recited steps with respect to the same character to obtain the average position vector $F_{ak}(X)$, $F_{ak}(Y)$ and a standard deviation $\Delta_k(X)$, $\Delta_k(Y)$ of the character; and a step for obtaining the X-axis and Y-axis characteristics $F(x)$, $F(y)$ with respect to all characters inputted through the scanner in the same manner as recited above and for detecting position coordinates of the characters which are expressed on an X-Y plane, on the basis of the average position vectors and the standard deviations of the characters, b) repeating step a) a plurality of times to obtain an average position vector and an average standard deviation of said extracted X-axis and Y-axis features;

c) obtaining a feature point of each individual character on an X-Y plane by using said average position vector of the individual character;

d) obtaining a plurality of X-axis and Y-axis histograms which accumulate the number of characters having the same X-axis and Y-axis coordinates of the feature point, respectively;

e) assigning said X-Y plane to a plurality of ranges which have a critical value of the X-axis, Y-axis coordinates of the feature points, respectively; and f) sorting position coordinates of the assigned ranges and the characters which belong to the individual ranges as reference data in storage means.

3. An apparatus for selecting candidate characters in a character recognition system, comprising:

character characteristic extracting means for extracting X-axis and Y-axis features of an inputted character on the basis of run-length information of said inputted character, said character characteristic extracting means including:

means for forming a box accurately circumscribing a character inputted through a scanner;

means for scanning character pixels in the character circumscribing box from left to right by units of a line to detect white runs and subsequent black runs of the character and storing the detected values $W_x(i)$, $B_x(i)$;

means for obtaining white run and black run pair values $WB_x(i)=W_x(i)+B_x(i)$ of the character when the scanning for the character is completed, by said means for scanning in the X-axis direction;

means for obtaining, on the basis of the detected white run values, black run values and white/black run pair values, an X-axis characteristic $F(x)$ of the character expressed as:

$$F(x) = \frac{\sum_i [W_x(i)][W_x(i)]}{\sum_i WB_x(i)} ;$$

means for scanning the character pixels in the character circumscribing box from top to bottom by units of a line to obtain a Y-axis characteristic $F(y)$ of the character in the same manner as obtaining the X-axis characteristic $F(x)$ of the character;

means for obtaining the average position vector $F_{ak}(X)$, $F_{ak}(Y)$ and a standard deviation $\Delta_k(X)$, $\Delta_k(Y)$ of the character;

means for obtaining the X-axis and Y-axis characteristics $F(x)$, $F(y)$ with respect to all characters inputted through the scanner in the same manner as recited above and for detecting position coordinates of the characters which are expressed on an X-Y plane, on the basis of the average position vectors and the standard deviations of the characters;

means for determining position information of the inputted character in an X-Y plane as a feature point on the basis of the extracted X-axis and Y-axis feature, the X-Y plane being segmented into a plurality of partitions;

means for classifying the inputted character into a class of characters which consists of characters belonging to the same partition with that of said feature point; and means for assigning said class of characters as candidate characters to the inputted character.

* * * * *